*J. Darling,*
*Horse Power.*

Nº 20,257. Patented May 18, 1858.

UNITED STATES PATENT OFFICE.

J. DARLING, OF CINCINNATI, OHIO.

HORSE-POWER.

Specification of Letters Patent No. 20,257, dated May 18, 1858.

*To all whom it may concern:*

Be it known that I, JEREMIAH DARLING, of Cincinnati, in the county of Hamilton and State of Ohio, have invented a new and useful Improvement in Horse-Powers; and I do hereby declare that the following is a full and exact description thereof, reference being had to the accompanying drawings, and to the letters of reference marked thereon.

Figure 1:
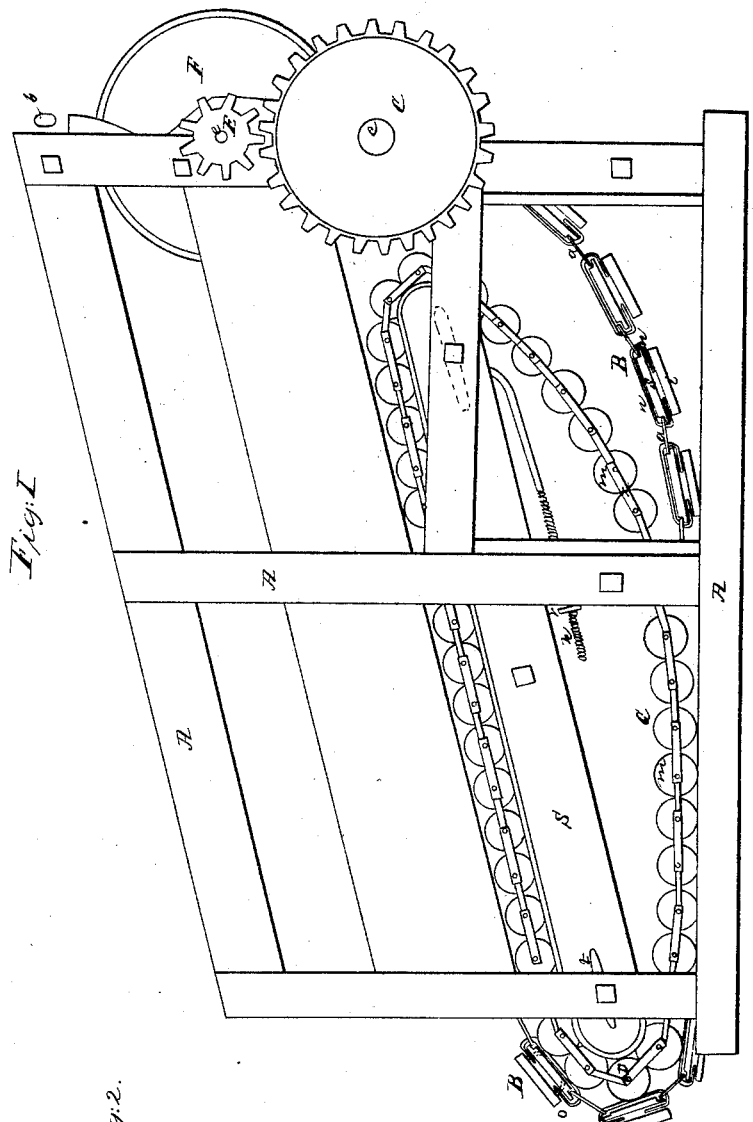
Figure 2:
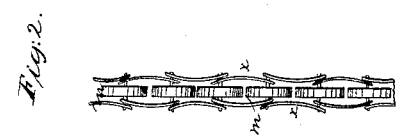
Figure 3:
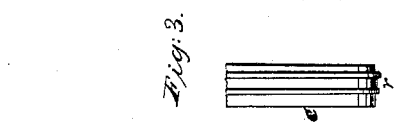

In the accompanying drawings, Figure 1, represents a side view of my machine. Fig. 2, is a top view of a detached portion of one of the series of friction rollers. Fig. 3, shows a part of the double flanged track of the friction rollers.

In the use of endless aprons in horse-powers the weight of the horse and apron are usually supported on journals so as to produce considerable friction. When chains are employed they are generally connected, and in case the chain on one side out-travels that upon the other, the chain is liable to be thrown off the track. The common cast iron straps of aprons are also liable to work loose and break. My improvements remedy these difficulties.

My invention consists of two or more independent endless chains or series of friction rollers, running in doube flanged tracks, in combination with an endless apron, of peculiar construction.

My horse-power may have any suitable frame A, with the endless apron B, inclined in the usual manner. The horse travels upon this apron B, the upper end of which passes over a wheel and gives motion to the main driving axle c, and cog wheel C. The cog wheel C, gears into the pinion E, whose shaft e, carries the band wheel F.

The endless apron B is supported by two or more independent and endless series of friction rollers, a side view of which is seen in Fig. 1, at G. Each roller m, turns upon an axle, both ends of which are riveted into the links x, Figs. 1, and 2. These rollers are very short and are bound together in a series by means of the two series of straight links x, so that a single roller cannot fall over alone. This series of rollers runs in a double flanged track, r, shown in Fig. 3. By this arrangement the series of friction rollers is guided and runs independently. These series of rollers relieve the apron B from friction, and consequently the weight of the horse tends directly to accelerate the motion of the machine. In common horse powers, on the contrary, the weight of the horse is thrown upon journals, the friction of which produces a serious loss of power. Another advantage of my friction rollers is the impossibility of cramping the rollers side wise, or of giving the apron a lateral motion by one series outrunning another, as is often the case when long rollers are used, or when two series of rollers are connected.

The husk S is adjustable by means of a screw rod h, and nut v, Fig. 1, for the purpose of tightening the apron at pleasure.

The endless apron B, has the usual bed pieces s, and wear pieces i. The bed pieces are connected by means of a closed link a, and an apron or strap link n. The ends of the strap link are secured by nails, as seen in dotted lines, o, Fig. 1. In driving these nails, their points are directed obliquely toward each other; they should be of sufficient length to strike the opposite side of the link and clench in the wood. These strap links are broad enough to ride steadily upon the tops of the rollers m, thus forming not only a part of the chain to connect the bed pieces s, but also serving as a track for the tops of the rollers. These links may be made of wrought strap iron. Such an apron is not only simple in construction, but it is also very durable. It is impossible for a nail to work loose. But the bolts and rivets in common aprons are liable to work loose and fall out, or the heads come off and occasion inconvenience or accident.

At the top of the machine is seen the end of a brake lever, b, which may be made to act upon the band wheel in case the band should fly off.

Having thus fully described my invention, what I claim and desire to secure by Letters Patent of the United States is:

The independent and endless series of friction rollers above described, in combination with the double flanged track r, and the peculiarly constructed endless apron B, for the purpose of preventing friction and for increasing the efficiency of the horse power, substantially as set forth.

JEREMIAH DARLING.

Witnesses:
 DANIEL BREED,
 EDM. F. BROWN.